United States Patent [19]

Baker

[11] Patent Number: 4,942,010

[45] Date of Patent: Jul. 17, 1990

[54] METHOD OF INJECTION MOLDING OF TUBULAR PARTS TO ELIMINATE WELD LINES

[75] Inventor: W. Howard Baker, Hartsville, Tenn.

[73] Assignee: Wynn's-Precision, Inc., Lebanon, Tenn.

[21] Appl. No.: 328,732

[22] Filed: Mar. 23, 1989

Related U.S. Application Data

[60] Continuation of Ser. No. 104,606, Nov. 18, 1987, abandoned, which is a division of Ser. No. 886,959, Jul. 17, 1986, Pat. No. 9,711,602.

[51] Int. Cl.$^5$ ............................................. B29C 31/04
[52] U.S. Cl. .............................. 264/328.12; 264/209.8; 264/537
[58] Field of Search ............... 425/206, 207, 380, 532, 425/533, 567, 577; 264/537, 209.1, 209.8, 328.12

[56] References Cited

U.S. PATENT DOCUMENTS

| | | | |
|---|---|---|---|
| 3,106,746 | 10/1963 | Sunday | 425/207 |
| 3,249,670 | 5/1966 | Rottner et al. | 264/209.8 |
| 3,266,092 | 8/1966 | Corbett | 264/173 |
| 3,296,662 | 1/1967 | Raley | 425/467 |
| 3,349,155 | 10/1967 | Valyi | 425/533 |
| 3,859,017 | 1/1975 | Meudec | 425/113 |
| 4,173,446 | 11/1979 | Larsen | 425/380 |
| 4,360,494 | 11/1982 | Kurtz | 425/380 |
| 4,462,782 | 7/1984 | Koser | 425/577 |
| 4,509,907 | 4/1985 | Ratheiser | 425/380 |
| 4,584,154 | 4/1986 | Cerny | 425/207 |
| 4,711,623 | 12/1987 | Gross et al. | 425/382.4 |

FOREIGN PATENT DOCUMENTS

| | | | |
|---|---|---|---|
| 60-6422 | 1/1985 | Japan | 425/207 |
| 100080 | 4/1962 | Norway . | |

Primary Examiner—Jill L. Heitbrink
Attorney, Agent, or Firm—Biebel, French & Nauman

[57] ABSTRACT

Injection molding method removing weld lines from a part, such as a parison, which weld lines are caused by the interruption or splitting of the flow of plastic material around core support pins or the like by the provision of an annular mixing chamber which opens into the plastic material flow passage. The plastic material is caused to move radially into the mixing chamber where it is spread by reason of the increasing volume encountered, accompanied by a reversal of flow radially inwardly into an annular injection gate. The movement of plastic material within the chamber and the resultant increase in temperature by reason of shear, eliminates the weld lines which have been formed in the material by reason of the splitting of flow around the pins.

2 Claims, 1 Drawing Sheet

METHOD OF INJECTION MOLDING OF TUBULAR PARTS TO ELIMINATE WELD LINES

This is a continuation of Ser. No. 104,606 filed Nov. 18, 1987 now abandoned which is a division of Ser. No. 886,459 filed July 17, 1986, now U.S. Pat. No. 4,711,602 issued Dec. 8, 1987.

BACKGROUND OF THE INVENTION

It has long been recognized that obstructions upstream of a gate, in the molding of tubular parts, such as parisons, about a core or pin, can result in flow lines in the part. In the case of a parison, the flow lines are carried to the blown part. Such flow lines are caused by the parting of the plastic material, such as a polymer, as it flows around an obstruction, such as a core-support pin, positioned upstream of the orifice or gate. At the least, flow lines result in poor appearance of the blown piece. However, such lines can severely impair the strength of a finished part. Strength impairment is particularly critical in the forming of parisons from thermoplastic polymers which have high melt viscosities and which, when parted, do not readily flow or mix together, or rejoin, in a laminar state. While the finished part may present only a slight marring when physically examined, with many such polymer materials it has been found that the finished part is also severely weakened along these lines and can lead to premature failure. Such premature failure is particularly critical in blown automotive bellows and boots which are subject to mechanical as well as environmental stresses.

The problem is particularly acute in the manufacture of boots and bellows and the like from parisons which are formed about cores, where the latter are supported by conventional radially extending core support pins at the inlet end of the mold. There accordingly exists a need for apparatus and method for the remixing of such polymer material on the downstream side of such core support pins to eliminate such weld lines and lines of imperfection or weakness in the completed part.

SUMMARY OF THE INVENTION

This invention relates to the molding of tubular parts and more particularly to the molding of parisons for use in the blow molding of finished parts, such as boots and bellows for automotive applications and the like. More particularly, the invention relates to the elimination of weld line problems caused by upstream obstructions in the polymer passageway, such as core support pins.

It is believed that the sensitivity of certain polymers to reform or reweld after having been separated by flow around a core pin or the like is due at least in part to the chilling or surface cooling of the polymer, such that it does not readily reweld downstream of the pin. As an example, while the polymer may be injected at 450° F., the metal making up the mold and mold parts may be substantially cooler, such as 340°, thus providing a chilling effect to the surface of the material where it has been parted.

It has been found that the material may be remixed to eliminate the weld line or line of discontinuity by causing the material to undergo shear, such as by causing the material to be folded back upon itself. The added turbulence and resulting heat dissipates the relative chill at the contact line, and permits the remixing of the polymer across the line boundaries, thereby rewelding the material as a homogeneous mass.

More particularly, the invention is adapted to the manufacture of parisons, to eliminate weld lines which are caused by the interruption or splitting of the flow of the plastic melt, between the injector and the gate opening into the parison cavity, by reason of one or more interposed core support pins which extend through the polymer passageway leading to the gate, upstream of the gate. A generally radially formed remixing chamber communicates at its inner circumference with the gate and with a generally radially outwardly directed flow passage downstream of the core support pins. The plastic material flows outwardly into the chamber into an expanding volume, where the flow is reversed accompanied by radially inward flow through into a contracting volume leading to the gate. The resulting shear has a tendency to increase the temperature of the polymer, and the resulting mixing by reason of the flow of the plastic first radially outwardly into the mixing chamber and then radially inwardly to the gate, effectively remixes the material across the weld lines so that the material entering the parison cavity through the gate is circumferentially homogeneous.

It is accordingly an important object of this invention to provide for the remixing of plastic material leading to an extrusion gate, in the manufacture of a parison.

Another object of the invention is the provision of injection apparatus and method in which a generally radially directed remixing chamber is positioned inwardly of an annular gate to a parison cavity.

Another object of the invention is the provision of molding apparatus in which weld seams otherwise caused by the division of flow of a polymer material to a cavity are eliminated by remixing.

A still further object of the invention is the remixing of plastic material which has been flow divided, in a generally radially arranged cavity, for delivery of such remixed material to a parison cavity through a gate free of weld lines or lines or weaknesses.

These and other objects and advantages of the invention will be apparent from the following description, the accompanying drawings, and the appended claims.

DESCRIPTION OF THE PREFERRED EMBODIMENT

Figure 1:
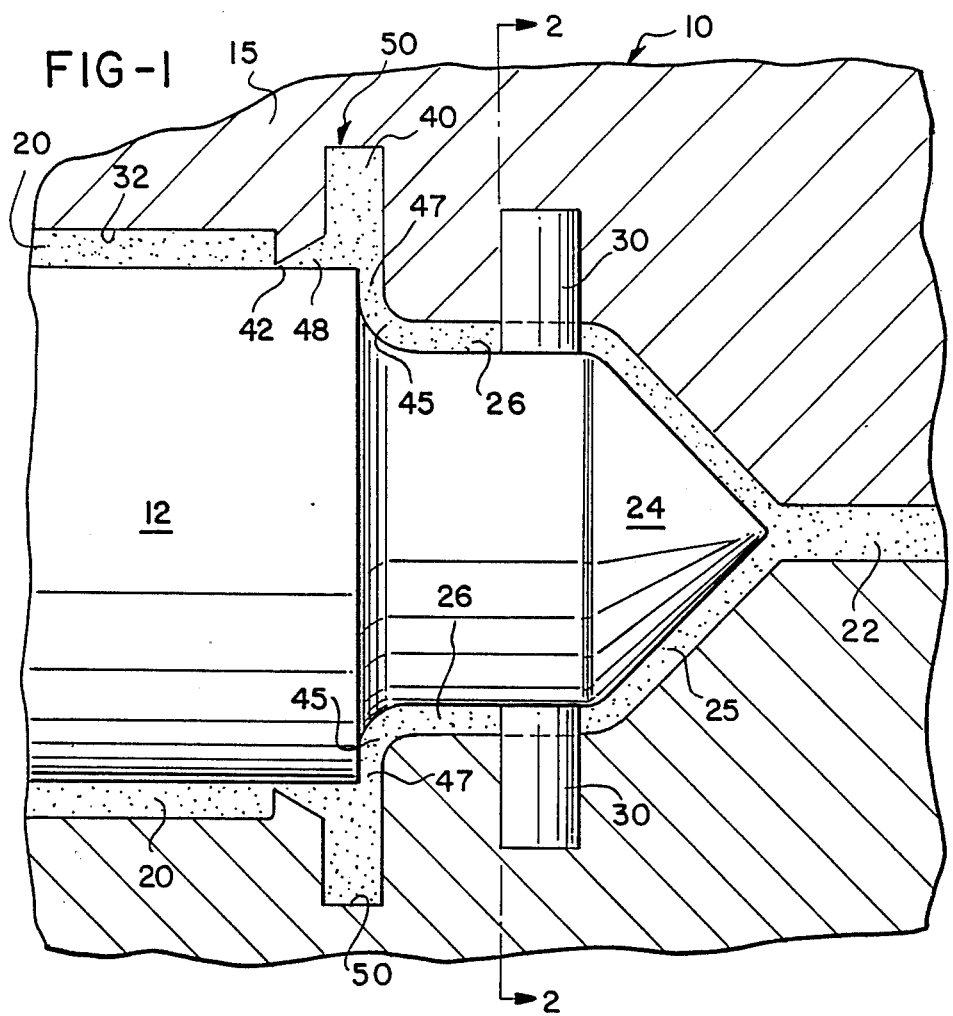
FIG. 1 is a fragmentary sectional view through a die head for the injection molding of parisons, incorporating a mixing chamber in accordance with this invention.

Referring to FIG. 1, a center fed or mold die head is illustrated generally at 10, as supporting a core pin 12, which core pin extends axially from the head 10 into the interior of a mold 15, for the extrusion or injection forming of a parison 20. The die head 10 is formed with a central melt passageway 22, which passageway is divided by the rear conical portion 24 of the core pin 12 into a circumferentially annular diverging passageway section 25 and to a cylindrical annular passageway section 26.

Figure 2:
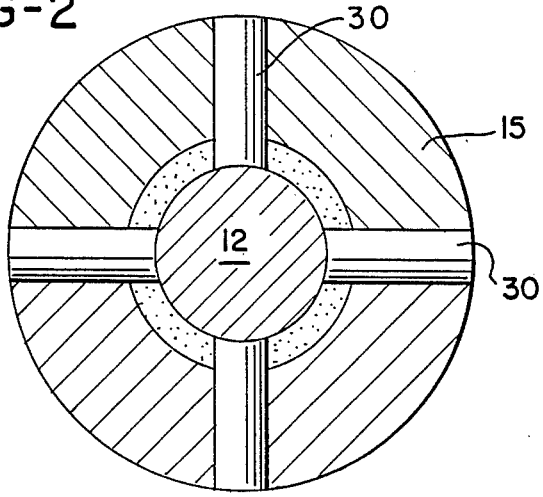
FIG. 2 is a transverse section looking generally along the line 2—2 of FIG. 1.

The core pin 12 itself is conventionally supported within the mold 15 on generally radially extending core support pins 30. The core support pins 30, which may be four in number, are shown in FIG. 2 as supporting the core pin generally centrally of the passageway 26 and centrally of the mold cavity 32 defined between the body of the core pin 12 and the mold 15. It will be understood that the central or inlet passage 22 is fed by a polymer resin or melt through a suitable adapter from a plastic injection machine, to form the parison 20. Center-fed molds of the kind shown are in common use since they have the advantage of providing a rather uniform distribution of the plastic melt around the core. However, the flow of polymer material is caused to be divided as it flows around the core support pins 30 and to the downstream side of the pins as defined by the passageway section 26.

The invention provides apparatus which causes the remixing of the polymer material downstream of the core pins 30 to eliminate the weld line which would otherwise be formed in the polymer material, as previously noted. For this purpose a generally radially-extending mixing chamber 40 is formed in the head 10 between the passageway 26 and an axially tapered gate 42 leading into the mold 15. The chamber 40 is connected to the passageway portion 26 through a radially out-turned section 45, which directs the polymer material radially outwardly into the cavity 40. As shown in FIG. 1, the mixing chamber defined by the cavity 40 is annular and is generally rectangular in cross section, and communicates with the polymer at an inlet region 47 at the outer end of the radial section 45 and communicates with the gate 42 at an outlet portion 48 axially spaced from the inlet port or region 47.

It will be noted that the mixing chamber 40 has a volume which is at least twice the volume of the flow channel defined by the passageway section 26 downstream of the impediments or pins 30. Further, it defines an offset which at least equals the radial dimensions of the channel portions 25 and 26, and in effect provides a region of expanding volume as the plastic material enters through the entrance region 47 and flows radially outwardly to the outer wall 50. The direction of movement of the material is reversed within the chamber 40 as the material proceeds to the outlet region 48 and to the gate 42 for injection into the mold cavity 32 to form the parison 20. The expanding volume of the chamber 40 in the radially outward direction, and the corresponding contracting volume occupied by the polymer material as its direction of flow reverses and moves radially inwardly effectively remixes the material across the weld lines or lines of parting, caused by the core pins 30. Further, the movement within the chamber 40 induces frictional heat into the material by reason of the shear on the material which overcomes the resistance of the material to reweld and reform across the shear lines otherwise caused by the chilling at the pins 30. When the material exits the chamber 40 through the region 48 and gate 42, it has been thoroughly remixed and no weld lines are visible thereafter.

While the method herein described, and the form of apparatus for carrying this method into effect, constitute preferred embodiments of this invention, it is to be understood that the invention is not limited to this precise method and form of apparatus, and that changes may be made in either without departing from the scope of the invention, which is defined in the appended claims.

What is claimed is:

1. In the delivery of molten plastic material to a mold in the manufacture of tubular plastic parisons in which the plastic material is delivered to the mold through a passageway, and in which the material is parted by an flow-dividing impediment in the passageway, the method of mixing said material downstream of said impediment to eliminate the weld line otherwise formed in the products by the impediment, comprising the steps of causing said material downstream of said impediment, comprising the steps of causing siad material downstream of said impediment and prior to delivery thereof to said mold to move in a direction generally radially outwardly into an annular mixing chamber which has increasing internal volume with increasing radial dimensions, causing said material to reverse direction in said chamber and flow radially inwardly upon itself while within said chamber to a constricted exit region at a radially inner portion of said chamber, whereby the movement of said material into an increasing volume followed by radial inflow upon itself induces frictional heat and causes remixing of said material across the weld line formed by the flow-dividing impediment.

2. The method of claim 1 in which said material is caused to move into said chamber which has at least twice the volume defined by the passageway immediately downstream of said impediment.

* * * * *